Feb. 8, 1966   D. M. VESPER   3,233,420
FRACTIONAL CRYSTALLIZATION
Filed May 27, 1963
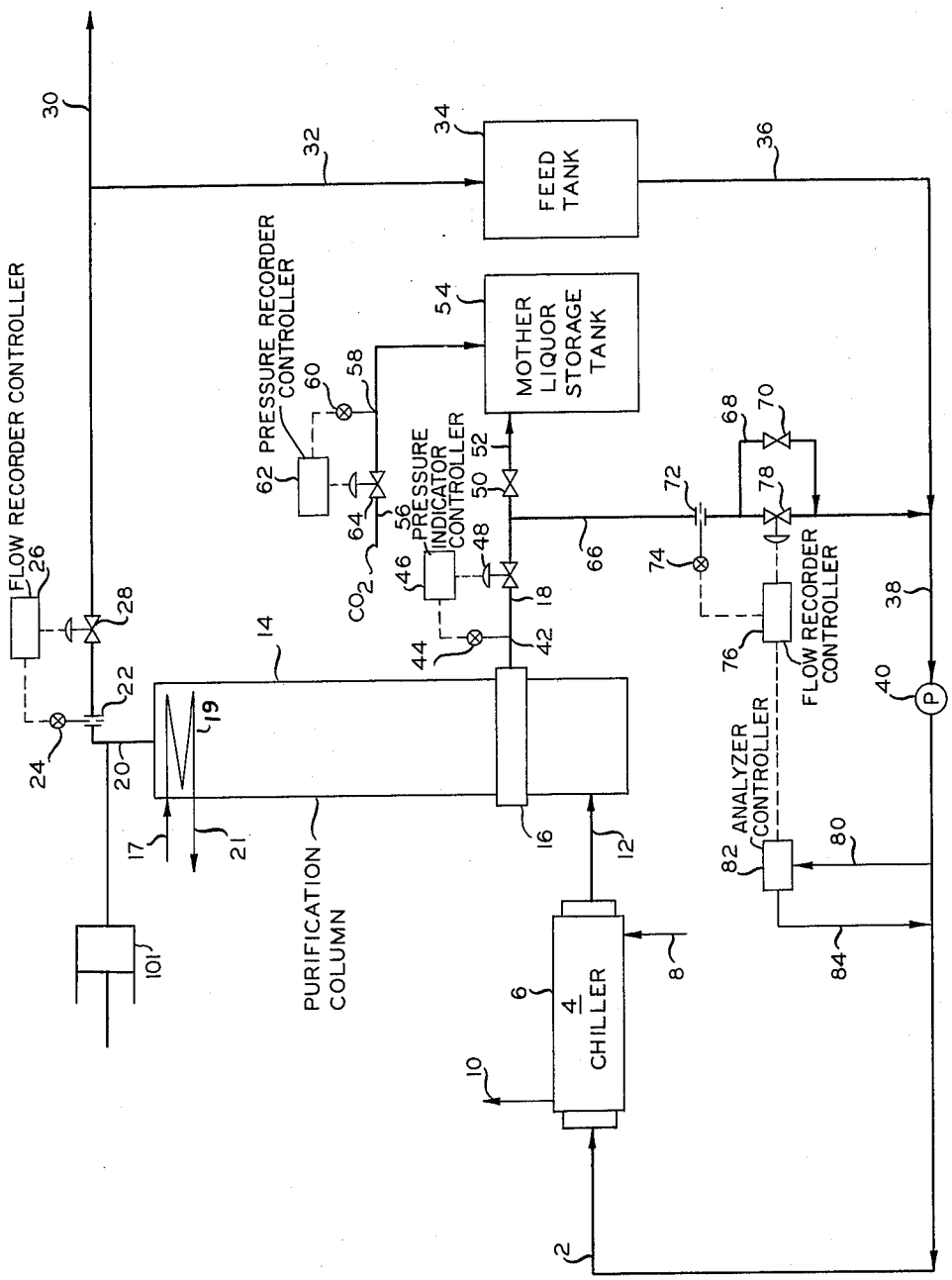
INVENTOR.
D. M. VESPER
BY *Young and Quigg*
ATTORNEYS United States Patent Office 3,233,420
Patented Feb. 8, 1966

3,233,420
FRACTIONAL CRYSTALLIZATION
Daniel M. Vesper, Bartlesville, Okla., assignor to Phillips Petroleum Company, a corporation of Delaware
Filed May 27, 1963, Ser. No. 283,345
9 Claims. (Cl. 62—58)

This invention relates to separating the components of a liquid mixture by means of fractional crystallization. In one aspect the invention ralates to the purification of crystals. In another aspect the invention relates to the recycling of mother liquor to a fractional crystallization system.

Purification of multi-compound mixtures by means of fractional crystallization has been known for a number of years. One suitable system, disclosed in Schmidt, Re. 23,810 (1954), involves moving a mixture of crystals and adhering liquid through a liquid removal zone, a reflux zone and a melting zone, withdrawing part of the melted product and forcing another part of the melt in a direction countercurrent to the movement of crystals in said reflux zone. These procesees are generally applicable to the separation of at least one pure component from any mixture which is resolvable into its components by fratcional crystallization. For example, fractional crystallization can be used for the concentration of fruit juices, vegetable juices, alcoholic beverages and other materials which comprise aqueous solutions which can be concentrated by the formation and removal of ice crystals. The process is also of great value in the resolution of non-aqueous mixtures, for example, the separation of paraxylene from a mixture thereof with other xylene isomers and ethyl benzene.

In many instances the multi-component system, such as beer, cannot be concentrated to the desired degree by passage through a single stage of crystallization. For example, in the concentration of beer passage through a crystallization unit which will concentrate the beer to a 30 percent slurry of ice crystals requires the mother liquor from the first stage to be additionally concentrated by passage through two or three additional stages (series operation) or a major portion of the mother liquor from a single stage to be recycled to the feed until the required amount of water is removed (recycle operation). In either case, it is most important that the concentration of the mother liquor either being recycled or being reintroduced into a separate crystallizer is controlled so that the ultimate value of the desired component, for example, alcohol in beer, is at the desired level.

It is an object of the invention to provide an improved method and apparatus for effecting the separation of components of a mixture.

It is another object of the invention to provide a method and means for the purification of crystals formed from a multi-component mixture.

Still another object of the invention is to remove water from an aqueous system.

Still another object of this invention is to provide a method and apparatus for the control of the alcoholic content in mother liquor being recycled to a crystallization apparatus.

These and other objects, aspects and advantages of the invention will be apparent from a study of the disclosure, drawing and appended claims.

These objects are broadly accomplished by a process for the concentration of a multi-component liquid mixture resolvable by crystallization comprising introducing said mixture as feed into a cooling zone, cooling said mixture to form a slurry of crystals in mother liquor, removing said slurry from said cooling zone, separating said crystals from mother liquor, recycling at least a portion of said mother liquor into said cooling zone, determining the concentration of at least one component in said mother liquor and adjusting the amount of said mother liquor being recycled responsive to said determination.

In one aspect of the invention the mother liquor is recycled to the cooling zone by blending said mother liquor with the feed and the amount of mother liquor blended with said feed is adjusted to provide a substantially constant concentration of said component in the feed to the cooling zone.

The invention will be described with primary reference to the removal of water from a beer containing approximately 3.5 percent alcohol so as to concentrate said beer to a conecntration of about 18 percent alcohol by the employment of a pulse-type crystal purification column such as Thomas 2,854,494 employing a chiller directly connected thereto, but the invention is not to be so limited. The invention is applicable to any type of multi-component liquid mixture resolvable by crystallization and to the employment of any type of separating means for the separation of the crystals from the mother liquor such as filters, centrifuges, cyclones, etc.

Referring now to the drawing in detail a feed mixture comprising two or more components, one of which is separable from the mixture by crystallization, is passed through the conduit 2 into a chiller 4. Chiller 4 may be cooled by any suitable means such as a cooling jacket 6 having an inlet 8 and an outlet 10. Generally agitating or scraping means are positioned within the cylindrical shell and are designed to prevent the accumulation of solid material on the inner surface of the cylindrical shell. Any type of mechanism for this purpose may be employed. Cooling of feed which enters the chiller 4 can be provided by passing a suitable coolant through inlet 8 and withdrawing the coolant through outlet 10. Sufficient cooling in the chiller 4 is provided so that a predetermined amount of solid crystals is produced from the feed passing therethrough. It is generally undesirable to form a slurry containing an excessive concentration of solids since the solids will be most difficult to transfer to a purification column or to the subsequent separating means. Generally this concentration is in the range of 30 to 60 weight percent ice or crystals in the slurry passing from the chiller 4 through conduit 12 into the purification column 14. This slurry passes first through a filtration section 16 and then through a reflux section and melting section, not shown, in the downstream portion of the purification column. Filtration section 16 comprises a suitable filter screen or medium and an external shell, the latter being provided with an outlet pipe 42 through which filtrate, i.e., the mother liquor, is passed. Further, medium 16 can be any desired type known in the art. For example, it can comprise a metallic screen, a perforate metal member or a perforate metal member supporting a filter cloth. The filtrate produced in filtration section 16 is removed from purification column 14 through conduit 18. Conduit 18 contains a suitable means, such as a valve 48, to maintain a predetermined back pressure. As shown herein, the pressure in the conduit 18 is determined by a pressure sensing means 42 and a signal is transmitted by means of transducer 44 to a pressure indicator controller 46 which adjusts the valve 48 to maintain the predetermined back pressure.

The remaining crystal mass is passed into a reflux section (not shown) wherein it is countercurrently contacted with liquid reflux. In this end portion of the purification column the crystal mass approaches heating element 19 through which a heating fluid is passed from conduit 17 and exits through conduit 21. This heating medium can be any heat exchange means including an electrical heater. Within this melting section the crystals are melted and a portion of the melt produced by the heat from the heating element 19 is withdrawn through withdrawal conduit 20. In many cases this will be the purified product of the process, although where it is desired to merely concentrate a mixture, such as an alcoholic beverage, the actual product would normally be considered to be the mother liquor with the melt being substantially pure water. The remainder of the melt is forced back through the reflux section to form reflux which effects crystal purification. The pulsation producing means 101, which may be a reciprocal piston in communication with conduit 20, produces a pulsating pressure in the melt reflux which is thereby intermittently forced back countercurrently with respect to the crystal mass in the purification column. The rate of withdrawal of the liquid through conduit 20 is preferably maintained substantially constant. A flow sensing means 22 connected to a transducer 24 produces a signal proportional to the flow and flow recorder controller 26 actuates valve 28 so as to maintain said flow substantially constant. Except during the initial start-up period this material is removed through conduit 30. However, during start-up the material will contain substantial quantities of the multi-component desired to be saved and thus will be passed through conduit 32 back into the feed storage tank 34.

The procedure for getting the process on-stream can be divided into three phases: (1) initial start-up, (2) concentrating, and (3) on-stream production. The initial start-up phase is the period during which the system is being filled with feed beer and the ice bed is being formed in the column.

Once the ice bed is formed the concentrating phase begins. This is the process of recycling all of the mother liquor back to the suction side of the feed pump 40 where it is diluted with beer from the feed tank 34 through conduits 36 and 38 and passed into the chiller 4 through conduit 2. As additional mother liquor is recycled it becomes more concentrated (the percent of ethanol in the solution increases) until the desired ethanol concentration is obtained. This is essentially a step-wise process. After the blend has reached the desired ethanol concentration, analyzer 82 begins to control valve 78 and the on-stream phase begins so that a portion of the mother liquor is removed as product into tank 54. The flow of mother liquor is controlled by the percent of ice which is present in the solution plus the purity of the water product desired. The split between the water product being removed from the solution and the mother liquor is actually controlled by the flow controller 26 on the water product line as hereinbefore described. The mother liquor removed from the filtration section 16 may be passed through conduit 18, valve 50 and conduit 52 into a mother liquor storage tank 54. The recycle portion of the mother liquor is passed through conduit 66 and valve 78 into conduit 38 where it is blended with the feed beer, or other material. The flow of the mother liquor is controlled by a back pressure regulator 46 as hereinbefore described. As the pressure down-stream of the back pressure regulator on the mother liquor line is always potentially greater than the pressure in the feed tank it will always be full of mother liquor to the suction side of the feed pump. Since the feed flow through the feed pump is always greater than the flow of mother liquor there will always be flow from the feed tank to dilute the mother liquor before entering the feed pump.

During the initial concentrating phase the bypass valve 70 in conduit 68 is open and the valve 78 in the mother liquor line is closed. This enables all of the mother liquor flowing from the column to be recycled. In order for there to be positive flow of mother liquor to the suction of the feed pump the pressure in the mother liquor storage tank must be maintained at a higher level than in the feed storage tank. This is the function of the pressure control system on the mother liquor storage tank comprising a conduit 56 through which carbon dioxide, in the case of beer, or the like, passes through a control valve 64 into the mother liquor storage tank 54. A pressure sensing means 58 and a transducer 60, transmit a signal to the pressure recorder controller 62, which adjusts or manipulates the valve 64 to control the pressure in the mother liquor storage tank.

In order to concentrate a beer from 3.5 percent ethanol and assuming a 30 percent water removal in each pass, it is necessary to take approximately 6 recycle passes in which all of the mother liquor is recycled to the chiller before the mother liquor product will reach the desired concentration of about 18 percent. This assumes that the ethanol in the mother liquor is diluted by the feed beer for the next recycle pass. Once the percent ethanol in the mother liquor reaches the desired level the process enters the last phase or on-stream production. The by-pass valve 70 is closed and the flow controller 76 is set to control the flow of mother liquor to the suction of the feed pump. This flow is determined by the percent of ethanol desired in the feed. The remaining flow of mother liquor is stored in the mother liquor storage tank 54. A flow sensing means 72 disposed in conduit 66 and a transducer 74, transmit a signal to flow recorder-controller 76 which adjusts the valve 78 to manipulate the amount of mother liquor being recycled to the feed passing through 38.

In order to adjust and control the percent ethanol in the mother liquor passing through conduit 52 into storage tank 54, it is necessary to determine the alcohol content of the blend being passed through conduit 52. The concentration of the ethanol may be determined in the mother liquor recycle line 66. This concentration of ethanol in the recycle along with the concentration of ethanol in the fresh feed from conduit 36 establishes the proper ratios of each stream required in conduit 38 to provide the correct concentration of ethanol in the feed to the chiller 4. In this application, an analyzer control system controls the flow of mother liquor into conduit 38 and thus controls the concentration of ethanol in the feed since the flow of feed through pump 40 is constant. In a preferred system a sample is removed from conduit 2 through conduit 80 and passes through an analyzer control system 82 and then through conduit 84 back into conduit 2. Analyzer control system 82 analyzes the product for the concentration of ethanol or the other desired component and transmits a signal to flow recorder controller 76 resetting its set-point so as to control the flow of ethanol through conduit 66. This analyzer controller may be any instrument capable of measuring the concentration of the desired component, such as ethanol, and the material passing into the chiller. A number of well known analyzers, such as infrared analyzers, ultraviolet analyzers, differential refractometers, or mass spectrometers, can be used, although a gas phase chromatographic analyzer such as described in U.S. Patent No. 2,943,702 to Hudson et al., is preferred. An example of a suitable instrument commercially available is a Perkin-Elmer model 184 Process Fractometer modified for liquid sample as described in U.S. Patent No. 2,757,541 to Watson et al.

If desired, this information may also be used in conjunction with a computing mechanism for controlling the chiller so as to maintain the percentage of the frozen solids in the slurry substantially concentrated.

The invention is broadly applicable to the resolution of any multi-component mixture which is resolvable by fractional crystallization. Preferably the invention is applicable to the materials separation of para-xylene from mixtures thereof and other xylenes, isomers, and ethyl benzene or other non-aqueous mixtures. Even more preferably the invention is applicable to the concentration or removal of water from beer. The invention is also applicable to production of fresh water from brine and to the concentration of aqueous solutions, examples of which include fruit juices, vegetable juices and alcoholic beverages.

The invention is best illustrated by the following example.

EXAMPLE

Regular strength beer containing 3.96 weight percent alcohol is blended at a rate of 107 gal./hr. through conduit 36 with recycle from conduit 66 and passed into chiller 4 and reduced in temperature to about 14° F. The residence time in the chiller is such that a slurry containing about 37 weight percent ice crystals is removed through conduit 12. The melt is removed through conduit 30 at a temperature of about 40° F. The mother liquor removed through conduit 18 is at a temperature of about 14° F. This mother liquor consitutes the desired concentrated product; 109 gal./hr. is recycled via line 66 to the feed and 27 gal./hr. containing 18.7 weight percent alcohol is taken as the final beer concentrate product.

*Table.—Material balance, lb./hr.*

| Component | Beer Feed | Recycle M.L. | Chiller Feed | Column Feed | Column Mother Liquor | Concentrate Product | Water From Column |
|---|---|---|---|---|---|---|---|
| Conduit No | 36 | 66 | 2 | 12 | 18 | 52 | 20 |
| Ethyl Alcohol | 34 | 136 | 170 | 170 | 170 | 34 | Tr |
| Soluble Solids | 45 | 180 | 225 | 225 | 225 | 45 | Tr |
| Water (liquid) | 813 | 592 | 1,405 | 739 | 739 | 147 | 666 |
| Water (ice) | | | | 666 | | | |
| Total Lbs./Hr | 892 | 908 | 1,800 | 1,800 | 1,134 | 226 | 666 |
| G.p.h. (flowing) | 107 | 109 | 216 | 223 | 136 | 27 | 80 |
| Wt. Percent Ice | | | | 37.0 | | | |
| Wt. Percent Alcohol (solids-free basis) | 3.96 | 18.7 | 10.8 | | 18.7 | 18.7 | 0.05 |
| Temperature, °F | 40 | 14 | 23 | 14 | 14 | 14 | 40 |
| B.p.h | 3.5 | 3.5 | 7.0 | 7.2 | 4.4 | 0.9 | 2.6 |

While certain examples, structures, composition and process steps have been described for purpose of illustration, the invention is not limited to these. Variation and modification within the scope of the disclosure and the claims can readily be effected by those skilled in the art.

I claim:

1. A process for the concentration of a multi-component liquid mixture comprising introducing said mixture as feed into a cooling zone, cooling said mixture to form a slurry of crystals in mohter liquor, removing said slurry from said cooling zone, separating said crystals and mother liquor, introducing at least a portion of said mother liquor into a cooling zone, determining the concentration of at least one component in said mother liquor and adjusting the amount of said mother liquor being introduced to said cooling zone responsive to said determination.

2. A process for the concentration of a multi-component liquid mixture resolvable by crystallization comprising introducing said mixture as feed into a cooling zone, cooling said mixture to form crystals of at least one component of said feed thereby forming a slurry of crystals in mother liquor, removing said slurry from said cooling zone, separating said mother liquor and said crystals, recycling to said cooling zone at least a portion of said mother liquor by blending said mother liquor with said feed, determining the concentration of at least one component in said blend and adjusting the amount of mother liquor blended with said feed to provide a substantially constant concentration of said component in the feed to said cooling zone.

3. A process for the removal of water from beer comprising introducing said beer as feed into a cooling zone, cooling said beer to form ice crystals from a portion of the water in said beer thereby forming a slurry of ice crystals in a mother liquor more concentrated in alcohol, removing said slurry from said cooling zone, separating said ice crystals from said mother liquor, recycling at least a portion of said mother liquor to said cooling zone, determining the concentration of alcohol in said recycle mother liquor and adjusting the ratio of recycle mother liquor to feed to provide a substantially constant concentration of alcohol being introduced to said cooling zone.

4. A process for the removal of water from beer comprising introducing said beer as feed into a cooling zone, cooling said beer to form ice crystals thereby forming a slurry of ice crystals in mother liquor more concentrated in alcohol, removing said slurry from said cooling zone, separating said ice crystals from said mother liquor, recycling at least a portion of said mother liquor to said cooling zone by blending with said feed, determining the concentration of alcohol in said blend and adjusting the ratio of mother liquor blended with said feed to provide a substantially constant concentration of alcohol being introduced to said cooling zone.

5. A process for the removal of water from beer comprising introducing beer as feed from a feed storage zone into a cooling zone, cooling said beer to form a slurry of 30–60 weight percent ice crystals in mother liquor more concentrated in alcohol, passing said slurry into a stationary filtering zone, withdrawing mother liquor from said filtering zone having an alcohol concentration of 3–20 weight percent, passing the resulting ice crystal mass from said filtering zone through a reflux zone and into a melting zone, melting said crystals in said melting zone by the application of heat to said crystals, withdrawing a portion of the resulting melt from said melting zone, passing the remainder of the melt into said reflux zone in a direction countercurrent to the movement of crystals therethrough, recycling at least a portion of said mother liquor to said cooling zone by blending with said feed, removing the remainder of the mother liquor to a storage zone, introducing carbon dioxide into said mother liquor storage zone to provide a pressure greater than the pressure in said feed storage zone, determining the concentration of alcohol in said blend and adjusting the amount of mother liquor being blended with said feed to provide a substantially constant concentration of alcohol being introduced into said cooling zone in the range of 3 to 15 weight percent.

6. Fractional apparatus comprising, in combination, a cooling chamber, means for cooling said chamber, an inlet and outlet means to said chamber, separating means in communication with said cooling chamber outlet, liquid withdrawal means connected to said separating means, a recycle conduit interconnecting said liquid withdrawal means and said cooling chamber, valve means disposed in said recycle conduit to control flow therethrough, measuring means disposed in the inlet means to said coolant chamber for determining concentration of at least one component of a multi-component liquid mixture and producing a signal proportional thereto, and adjusting means operatively connected to said valve means and said measuring means to manipulate said valve means responsive to said signal.

7. Fractional crystallization apparatus comprising, in combination, a feed storage vessel, a cooling chamber, a feed conduit interconnecting said feed storage vessel and said cooling chamber, means for cooling said chamber, an outlet from said cooling chamber connected to a solids-liquid separating means by a first conduit, a withdrawal conduit connected to said separating means and a mother liquor storage means, a recycle conduit interconnecting said withdrawal conduit and said feed conduit, valve means disposed in said recycle conduit to control flow therethrough, measuring means for determining the concentration of at least one component in said feed conduit and producing a signal proportional thereto, and adjusting means operatively connected to said valve means and said measuring means to manipulate said valve means responsive to said signal.

8. Fractional crystallization and purification apparatus comprising in combination a feed storage vessel, a cooling chamber, means for cooling said chamber, a purification chamber in open communication with said chamber, feed conduit means interconnecting said feed storage vessel and the portion of said cooling chamber opposite said purification chamber, stationary filtration means positioned in said purification chamber, liquid outlet means connected to said filtration means, melting means positioned downstream of said filtration means, melt withdrawal means connected to the end portion of said purification chamber opposite said cooling chamber, means for propelling solids from said cooling chamber through said purification chamber toward said melting means, means for producing an intermittent back pressure in said purification chamber, a withdrawal conduit interconnecting said liquid outlet means and a mother liquor storage means, means for applying a pressure on the contents of said mother liquor storage means, a recycle conduit interconnecting said withdrawal conduit and said feed conduit, valve means disposed in said recycle conduit to control flow therethrough, measuring means for determining the concentration of at least one component in said feed conduit and producing a signal proportional thereto, and adjusting means operatively connected to said valve means and said measuring means to manipulate said valve means responsive to said signal.

9. The apparatus of claim 8 wherein said measuring means comprises a chromatographic analyzer.

References Cited by the Examiner

UNITED STATES PATENTS

| | | |
|---|---|---|
| 2,800,411 | 7/1957 | Church. |
| 2,926,087 | 2/1960 | Rickers _____ 62—49 |
| 2,940,272 | 6/1960 | Croley _____ 62—58 |
| 2,981,773 | 4/1961 | Weedman. |
| 3,050,952 | 8/1962 | Marwil. |

NORMAN YUDKOFF, *Primary Examiner.*